US009730121B2

(12) United States Patent
Endo

(10) Patent No.: US 9,730,121 B2
(45) Date of Patent: Aug. 8, 2017

(54) FEMTO GATEWAY AND CONTROL METHOD OF FEMTO GATEWAY

(71) Applicant: NEC Corporation, Tokyo (JP)

(72) Inventor: Hiroya Endo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/024,223

(22) PCT Filed: Sep. 11, 2014

(86) PCT No.: PCT/JP2014/004675
§ 371 (c)(1),
(2) Date: Mar. 24, 2016

(87) PCT Pub. No.: WO2015/045306
PCT Pub. Date: Apr. 2, 2015

(65) Prior Publication Data
US 2016/0219467 A1    Jul. 28, 2016

(30) Foreign Application Priority Data
Sep. 27, 2013  (JP) ................ 2013-201990

(51) Int. Cl.
H04W 36/00    (2009.01)
H04W 24/04    (2009.01)
(Continued)

(52) U.S. Cl.
CPC ......... *H04W 36/0061* (2013.01); *H04J 11/00* (2013.01); *H04L 41/0663* (2013.01);
(Continued)

(58) Field of Classification Search
USPC ........................................... 455/438
See application file for complete search history.

(56) References Cited

U.S. PATENT DOCUMENTS 8,059,602 B2   11/2011  Kim
8,305,966 B2   11/2012  Chou
(Continued)

FOREIGN PATENT DOCUMENTS

JP    2009506704 A    2/2009
JP    2012-010305     1/2012
(Continued)

OTHER PUBLICATIONS

International Search Report, PCT/JP2014/004675, Nov. 18, 2014.
(Continued)

*Primary Examiner* — Joel Ajayi
(74) *Attorney, Agent, or Firm* — Young & Thompson

(57) ABSTRACT

A femto gateway includes a first communication unit that communicates with a core node, a second communication unit that communicates with a femto cell base station, an adjacent-base-station information storage unit that holds adjacent-base-station information that is information on a base station adjacent to the femto cell base station, and an adjacent-base-station information transmission unit that transmits the adjacent-base-station information to the femto cell base station. A terminal connecting with a femto cell base station acquires adjacent-base-station information via the femto cell base station.

4 Claims, 9 Drawing Sheets

(51) Int. Cl.
  *H04J 11/00* (2006.01)
  *H04L 12/24* (2006.01)
  *H04W 16/32* (2009.01)
  *H04W 36/08* (2009.01)
  *H04W 36/22* (2009.01)
  *H04W 60/06* (2009.01)
  *H04W 84/10* (2009.01)
  *H04W 88/16* (2009.01)

(52) U.S. Cl.
  CPC ........... *H04W 16/32* (2013.01); *H04W 24/04* (2013.01); *H04W 36/08* (2013.01); *H04W 36/22* (2013.01); *H04W 60/06* (2013.01); *H04W 84/105* (2013.01); *H04W 88/16* (2013.01)

(56) References Cited

U.S. PATENT DOCUMENTS

| | | |
|---|---|---|
| 2008/0227455 A1 | 9/2008 | Kim |
| 2010/0190496 A1* | 7/2010 | Chinnathambi .. H04W 36/0061 455/435.1 |
| 2011/0317544 A1 | 12/2011 | Chou |
| 2013/0012212 A1 | 1/2013 | Murakami et al. |
| 2013/0237221 A1 | 9/2013 | Drazynski |

FOREIGN PATENT DOCUMENTS

| | | |
|---|---|---|
| JP | 2012-039366 | 2/2012 |
| JP | 2012-256979 | 12/2012 |
| JP | 2013-535150 | 9/2013 |

OTHER PUBLICATIONS

3GPP_TS_36.300_V11.6.0 (Jun. 2013), published by 3GPP (registered trademark).
Japanese Office Action dated Mar. 14, 2017; Application No. 2015-538873.
Extended European Search Report (EESR) dated Mar. 13, 2017; Application No. 14849701.9.
Alcatel-Lucent "On Unavailability" 3GPP Draft; R3-101441-CN Unavailability, 3rd Generation Partnership Project (3GPP), Mobile Competence Centre; 650, Route Des Lucioles, F-06921 Sophia-Antipolis Cedex; France, pp. 1-3.

* cited by examiner

Fig. 3

| PRIORITY | BASE STATION NAME | ADDRESS |
|---|---|---|
| 1 | MACRO BASE STATION_005003 | ...... |
| 2 | MICRO BASE STATION_29F09C05 | ...... |
| 3 | FEMTO CELL BASE STATION_09A00N63 | ...... |
| 4 | MACRO BASE STATION_080334 | ...... |
| .... | ... | ... |

FEMTO GATEWAY AND CONTROL METHOD OF FEMTO GATEWAY

TECHNICAL FIELD

The present invention relates to a femto gateway and a control method of the femto gateway.

BACKGROUND ART

Introduction of a femto cell base station (Home NodeB, or HNB) is being promoted in a mobile communications system such as of 3G (3rd Generation) and LTE (Long Term Evolution). A femto cell base station is a base station device which builds a femto cell having a communication range within some tens of meters in radius. A femto cell base station assumes the role of supplementing an area which cannot be covered by the wireless area of a macro base station having a communication range of a several kilometers in radius, and of offering a high-quality communication service in a home and the like. Meanwhile, in LTE, a femto cell base station is called HeNodeB (Home eNodeB) or HeNB.

In terms of a system configuration, each femto cell base station is given accommodation by a femto gateway that is an upper device. Its specification is disclosed in non-patent document 1. Meanwhile, a gateway may be abbreviated to GW hereinafter. A femto GW is connected to MME (Mobility Management Entity) and S-GW (Serving Gateway) that are higher rank core nodes. Furthermore, a femto GW can be connected to a plurality of higher rank core nodes for the purpose of load sharing and the like of the higher rank core nodes.

Here, it is assumed that a failure has occurred in a femto GW and communication with all higher rank core nodes has become impossible. In this case, in a wireless area formed by each femto cell base station connecting to the femto GW, a communication service cannot be provided for a terminal any more. However, each femto cell base station tries to continue communication with the femto GW. For this reason, in a terminal connecting with each femto cell base station, a state not to be able to enjoy a service will continue.

A method to settle this problem is disclosed in patent document 1, for example. In this technology, when a failure occurs in the connection between a femto GW and a higher rank communication network, the femto GW transmits a domain regulation message to each accommodated femto cell base station, first. Then, a femto cell base station transmits a message to the effect that access is not possible to a connected terminal. When this message is received, the terminal cuts a connection with the femto cell base station. Then, by user's operation, the terminal for which connection has been cut tries reconnection by the following two methods. 1) A femto cell base station that can communicate is searched for from adjacent femto cell base stations successively. 2) A macro base station which can be connected is searched for.

In this way, according to the technology of patent document 1, even if a connected femto GW becomes unable to communicate with a higher rank core node, communication with a core network can be recovered without repeating wasteful retries.

CITATION LIST

Patent Literature

[PTL 1] Japanese Patent Application Laid-Open No. 2012-39366

Non Patent Literature

[NPL 1] 3GPP_TS_36.300_V11.6.0 (June 2013), published by 3GPP (registered trademark)

SUMMARY OF INVENTION

Technical Problem

However, because, in the technology of patent document 1, a terminal performs base station search successively when a femto GW has become unable to communicate with a network of a higher rank, there is a problem that it takes a time to recover communication.

An object of the present invention has been made in view of the above-mentioned problem, and is to provide a femto GW with which a terminal can recover communication quickly, and a communication method using the femto GW.

Solution to Problem

In order to settle the above-mentioned problem, a femto gateway of the present invention includes: a first communication means configured to communicate with a core node; a second communication means configured to communicate with a femto cell base station; an adjacent-base-station information storage means configured to hold adjacent-base-station information, the adjacent-base-station information being information on a base station adjacent to the femto cell base station; and an adjacent-base-station information transmission means configured to transmit the adjacent-base-station information to the femto cell base station.

Advantageous Effects of Invention

An effect of the present invention is that a terminal can recover communication quickly when a femto gateway to which the terminal is being connected becomes unable to communicate with a core node.

BRIEF DESCRIPTION OF DRAWINGS

FIG. 3 is a table showing an example of adjacent-base-station information of the second exemplary embodiment of the present invention.

DESCRIPTION OF EMBODIMENTS

Hereinafter, the invention will be described in detail with reference to a drawing. A femto GW of the present invention can achieve rapid communication recovery when communication with a higher rank core node becomes impossible, by changing a connection destination of a terminal connecting with itself to another base station quickly.

First Exemplary Embodiment

Figure 9:
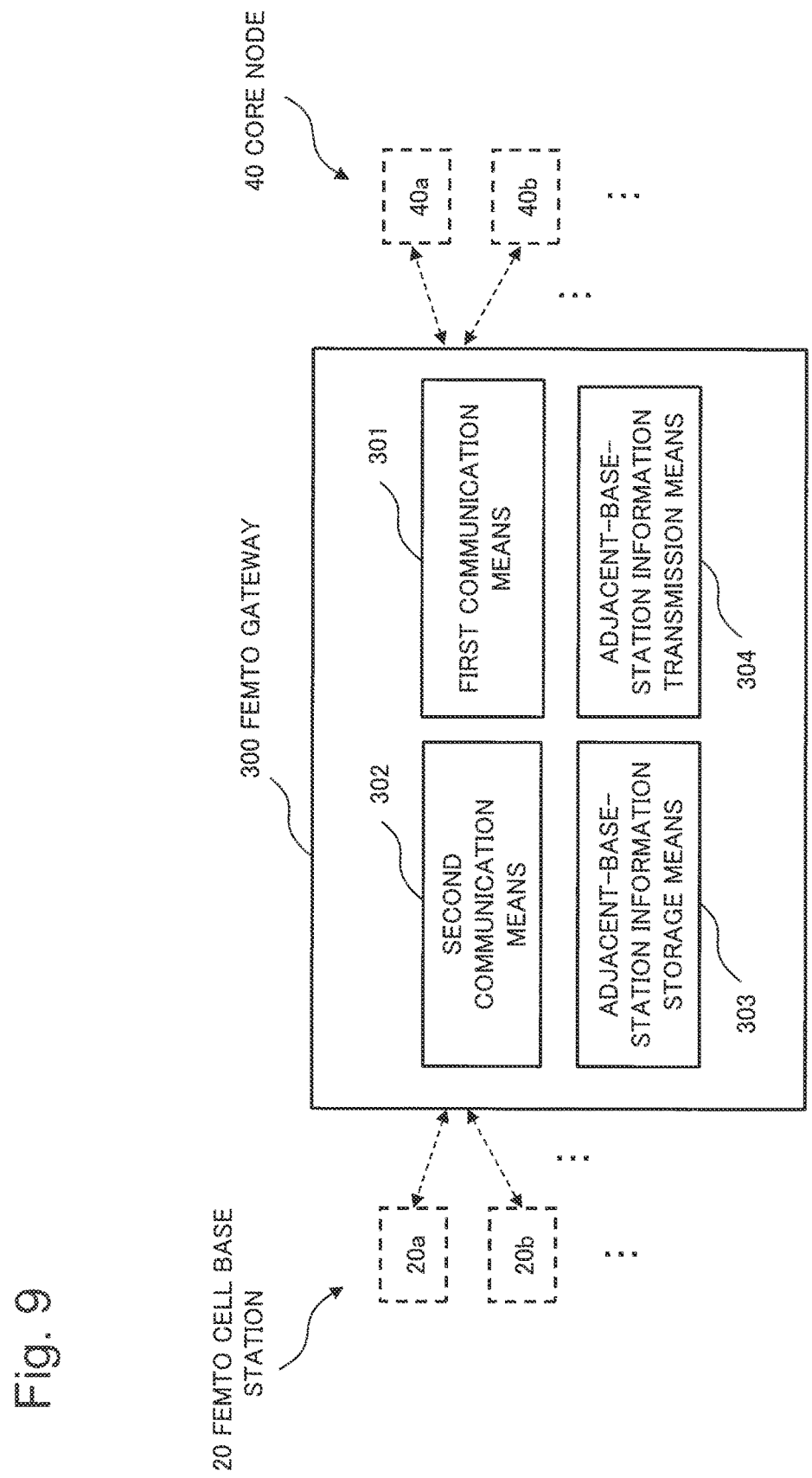
FIG. 9 is a block diagram showing a first exemplary embodiment of the present invention.

FIG. 9 is a block diagram showing a femto gateway of the first exemplary embodiment of the present invention. A femto gateway 300 includes a first communication means 301 that communicates with a core node 40, and a second communication means 302 that communicates with a femto cell base station 20. The femto gateway 300 also includes an adjacent-base-station information storage means 303 and an adjacent-base-station information transmission means 304. The adjacent-base-station information storage means 303 holds adjacent-base-station information that is information on base stations adjacent to the femto cell base station 20. The adjacent-base-station information transmission means 304 transmits adjacent-base-station information to the femto cell base station 20.

As it has been described above, according to this exemplary embodiment, a femto gateway which provides accommodation for a femto cell base station can provide adjacent-base-station information to the femto cell base station. Then, the femto cell base station can provide the adjacent-base-station information to a terminal which is connected with it. For this reason, when the femto gateway has become unable to communicate with a core node, the terminal can find a substitution base station promptly using the adjacent-base-station information to recover communication.

Second Exemplary Embodiment

Figure 1:
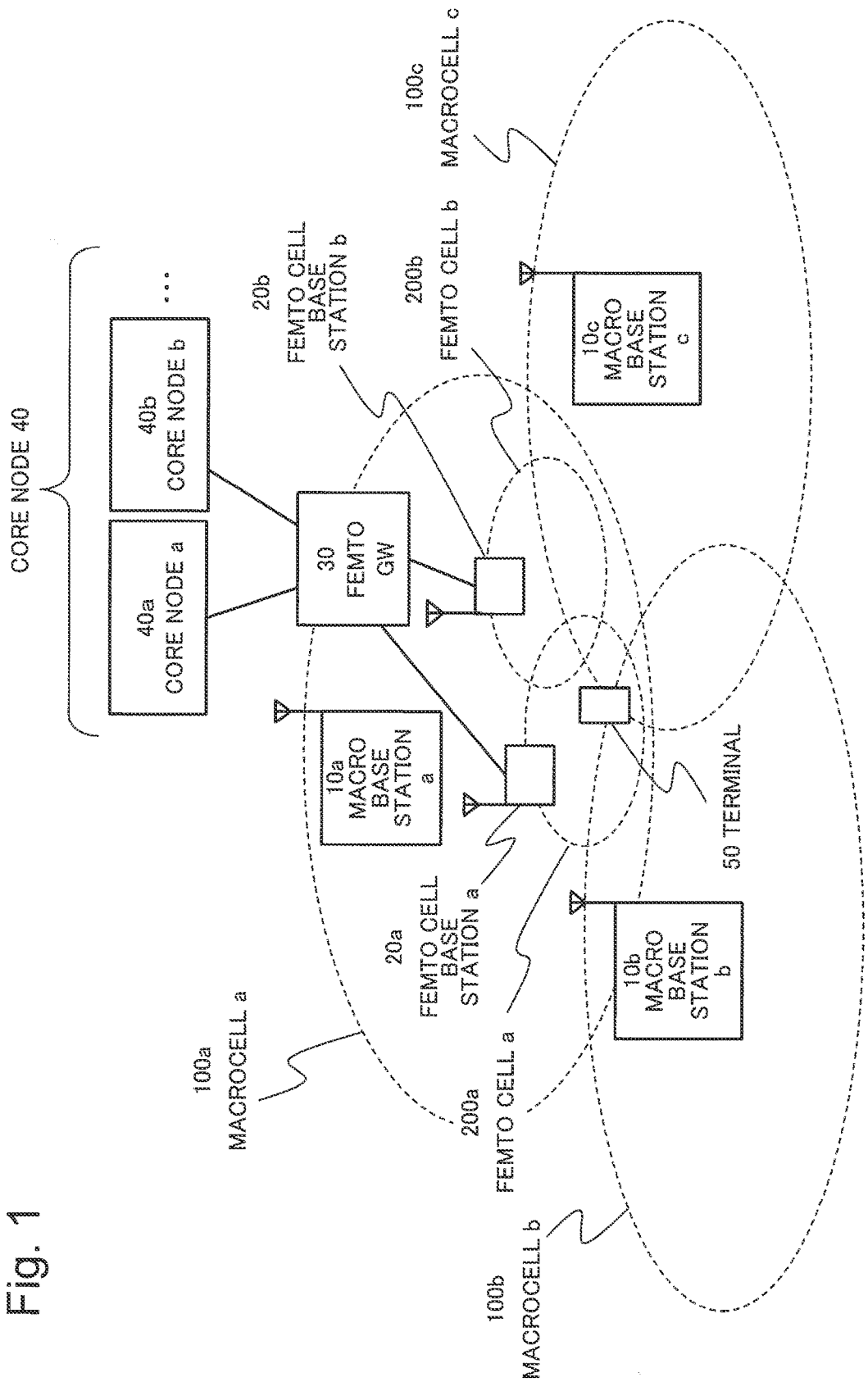
FIG. 1 is a block diagram showing the entire structure of a communication network to which a second embodiment of the present invention is applied.

FIG. 1 is a block diagram showing the entire structure of a mobile communication network to which the present invention is applied. A plurality of pieces of macro base station 10 are installed in a certain area. Here, an example in which three macro base stations 10a, 10b, and 10c are installed is indicated. Each piece of macro base station 10 forms each piece of macrocell 100 that is a communication area. Macrocells 100a, 100b, and 100c correspond to the macro base stations 10a, 10b, and 10c. The respective pieces of macrocell 100 have a slight overlap with each other. Meanwhile, although not being illustrated, each piece of macro base station 10 communicates with a core network.

Independently from a macro base station, the femto cell base station 20 is provided. Each piece of femto cell base station 20 is given accommodation by one piece of femto GW 30. Then, the femto GW 30 communicates with the core node 40. The femto GW 30 can communicate with a plurality of pieces of core node 40 for load sharing and the like. In the example of FIG. 1, femto cell base stations 20a and 20b . . . are given accommodation by the femto GW 30, and the femto GW 30 is communicating with a plurality of core nodes 40a, 40b . . . .

Each piece of femto cell base station 20 forms a femto cell 200 that is a communication area of about some tens of meters in radius. A terminal 50 that exists in the femto cell 200 can communicate with the core node 40 via the femto cell base station 20 and the femto GW 30. Meanwhile, although two pieces of femto cell base station 20 are being illustrated in FIG. 1, the number of them may be larger than two. Also, although not being illustrated, the terminal 50 connected to the femto cell base station 20a may be a plurality of pieces of terminal 50. Additionally, a micro-base station that covers a range from some tens of meters to some hundreds of meters in radius, the range being intermediate between the macro base station 10 and the femto cell base station 20, may exist.

The femto GW 30 provides accommodation for a plurality of pieces of femto cell base station 20. The femto GW 30 performs registration management and signal processing about each piece of femto cell base station 20 and pieces of terminal 50 connecting with the femto cell base station 20 in question, and mediates communication with the core node 40. The femto GW 30 can be connected with a plurality of pieces of higher rank core node 40. Although two connections are shown in FIG. 1, connections may be more than two.

Figure 2:
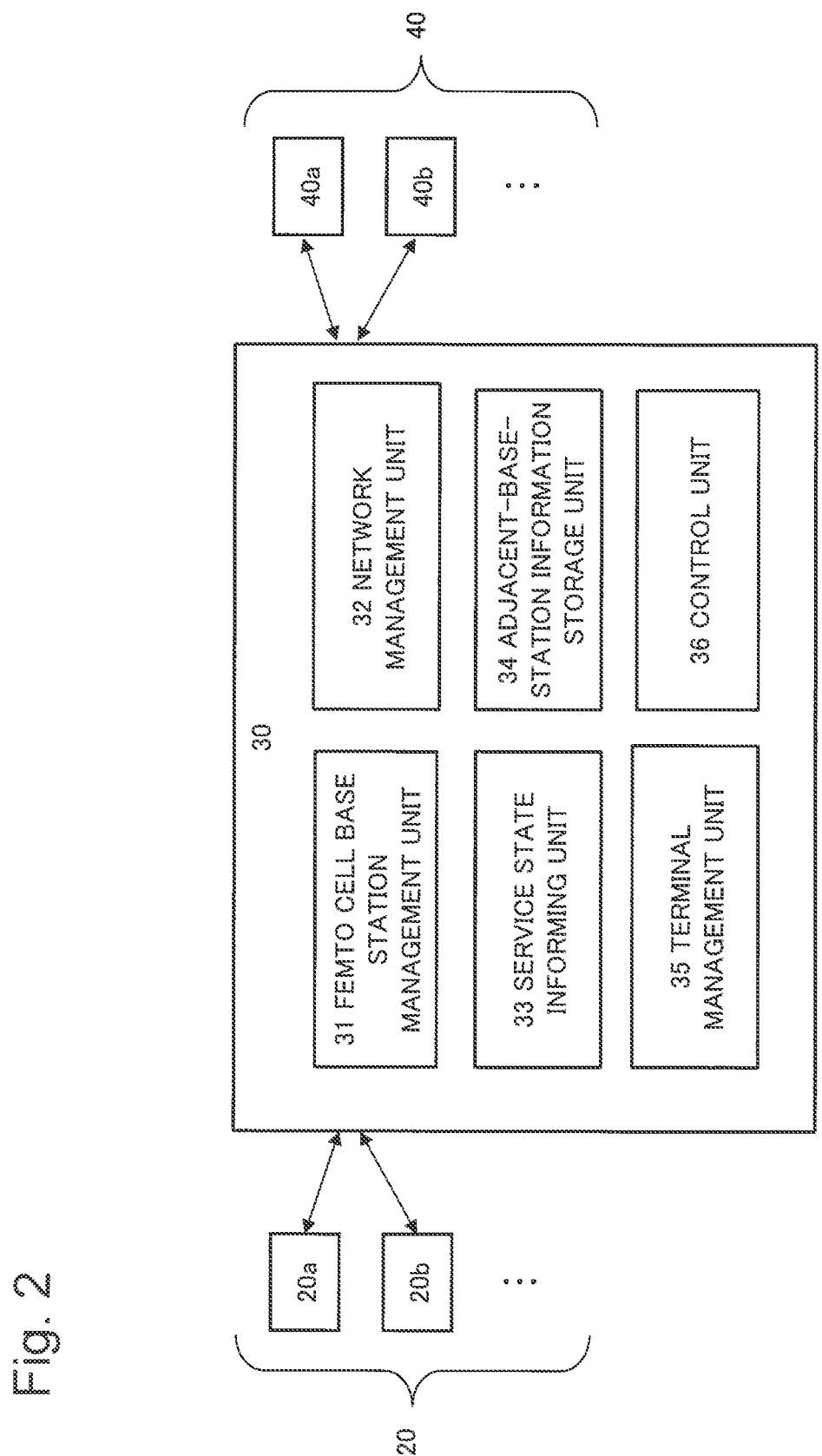
FIG. 2 is a block diagram showing a structure of a femto GW of the second exemplary embodiment of the present invention.

FIG. 2 is a block diagram showing a structure of the femto GW 30 of this exemplary embodiment. The femto GW 30 includes a femto cell base station management unit 31, a network management unit 32, a service state informing unit 33, an adjacent-base-station information storage unit 34, a terminal management unit 35 and a control unit 36.

The femto cell base station management unit 31 manages a connection with the femto cell base station 20 that communicates with the femto GW 30.

The network management unit 32 manages a connection with the core node 40 with which the femto GW 30 communicates.

When a service state changes, the service state informing unit 33 notifies the femto cell base station 20 of the service state. Specifically, a service suspension notification is notified to the femto cell base station 20 when communication with all pieces of core node 40 connecting with the femto GW 30 have become unavailable, and a service start notification is notified when it returns to a service available state from a service unavailable state.

The adjacent-base-station information storage unit 34 holds information on the macro base station 10 closest to the femto GW 30 and the macro base station 10 adjacent to the femto GW 30. The adjacent-base-station information storage unit 34 also holds information on an adjacent base station to mediate communication between the terminal 50 and the core node 40 shown in FIG. 1, such as information on the femto cell base station 20 connecting with another femto GW 30. When communication with the core node 40 becomes unavailable, the adjacent-base-station information stored here is transmitted to the terminal 50 via the femto cell base station 20. The terminal 50 can determine a substitution connection destination promptly using the received adjacent-base-station information.

It is desired that the order of priority of substitution connection destinations be given to adjacent-base-station information considering easiness of connection for the terminal 50. An example of this is shown in FIG. 3. The table holds an order of priority, the name of a base station and its address. By doing so, even when a concentration of access has happened, a connection destination can be searched for successively following the order of priority.

The terminal management unit 35 manages connection of the terminal 50 with which each femto cell base station 20 connects. When the femto GW 30 becomes unable to communicate with the core node 40, the terminal management unit 35 makes the service state informing unit 33 transmit service suspension notification. Then, information held by the adjacent-base-station information storage unit 34 is transmitted to the terminal 50. Next, a release request of connection with the terminal 50 is transmitted.

The control unit 36 controls each component part of the femto GW 30, and controls operations as a whole.

Figure 4:
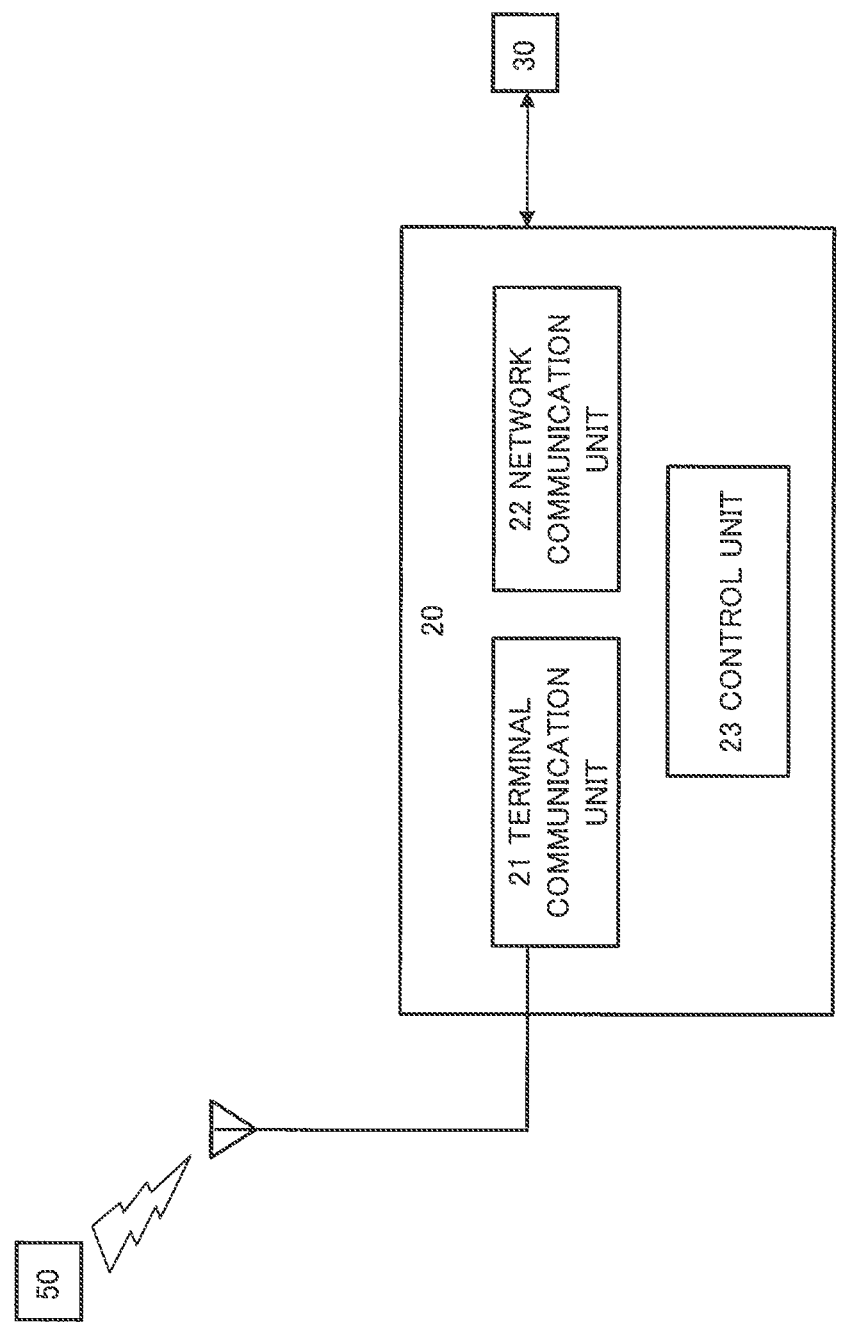
FIG. 4 is a block diagram showing a structure of a femto cell base station related to the second exemplary embodiment of the present invention.

FIG. 4 is a block diagram of the femto cell base station 20 in this exemplary embodiment. The femto cell base station 20 includes a terminal communication unit 21, a network communication unit 22 and a control unit 23.

The terminal communication unit 21 performs wireless communication processing such as wireless modulation and demodulation to carry out wireless communication with the terminal 50.

The network communication unit 22 communicates with upper nodes such as the femto GW 30 or others.

The control unit 23 controls the terminal communication unit 21 and the network communication unit 22, and manages connection states. Also, the control unit 23 performs necessary signal processing, and stores data. The function of the control unit 23 also includes a termination function of various control messages sent to and received from the terminal 50 and the femto GW 30.

Figure 5:
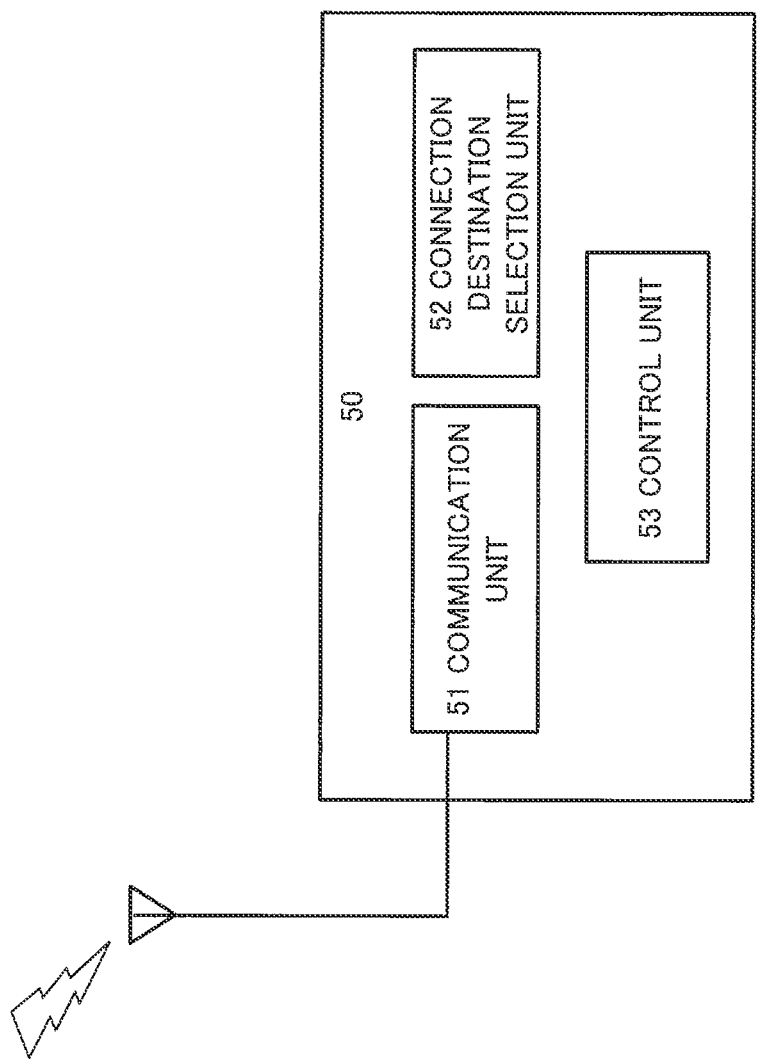
FIG. 5 is a block diagram showing a structure of a terminal related to the second exemplary embodiment of the present invention.

FIG. 5 is a block diagram showing a structure of the terminal 50. The terminal 50 has a communication unit 51, a connection destination selection unit 52 and a control unit 53.

The communication unit 51 communicates with the femto cell base station 20 and other base stations.

The connection destination selection unit 52 has a function to select, when communication with the femto cell base station 20 that is a connection destination at usual time in the femto cell 200 is stopped, the next connection destination. At that time, the connection destination selection unit 52 refers to the adjacent-base-station information received from the femto cell base station 20 and selects a connection destination following the order of priority described in it.

The control unit 53 controls the terminal 50 as a whole.

Figure 6:
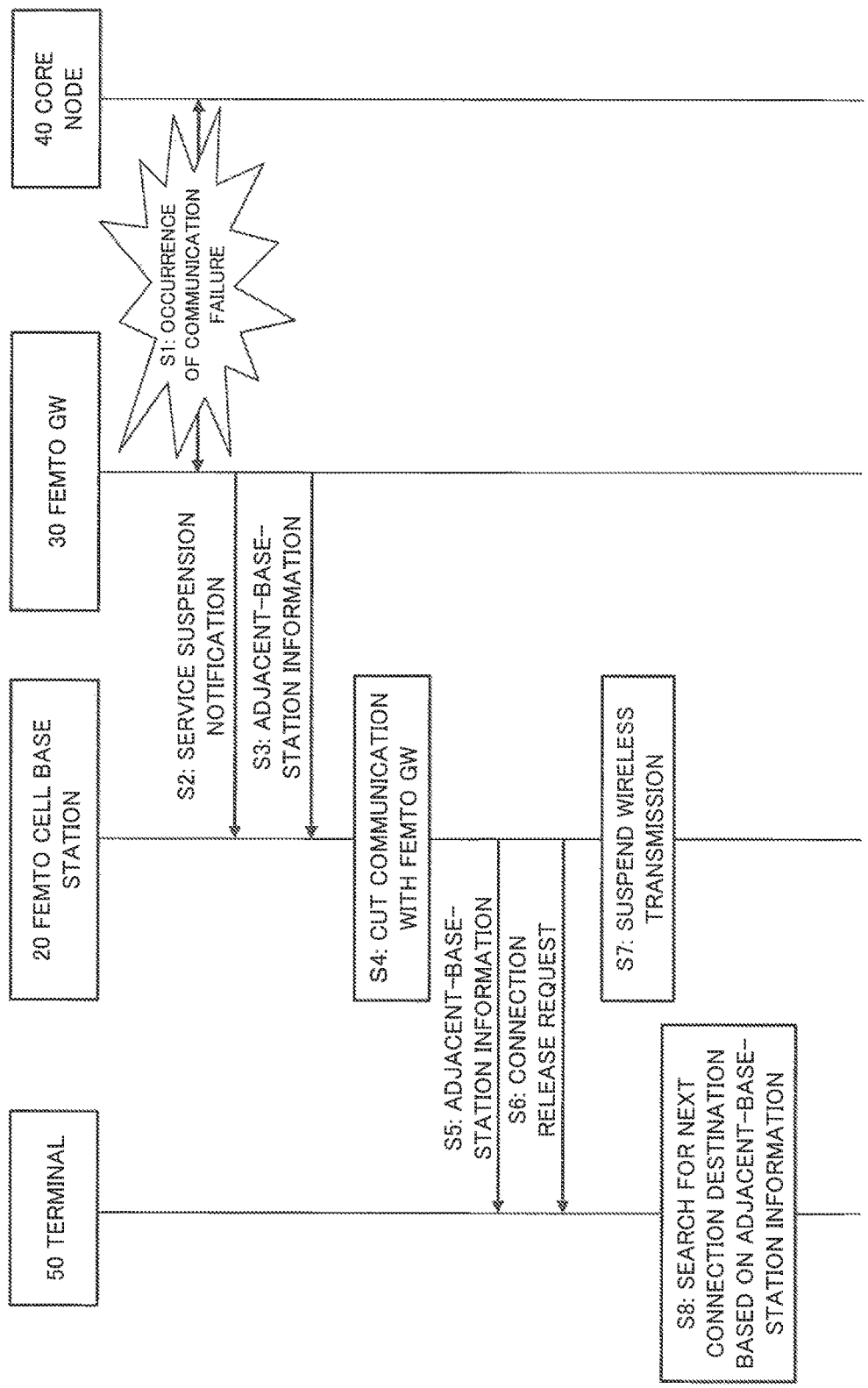
FIG. 6 is a sequence diagram showing operations at the time of communication disconnection of the second exemplary embodiment of the present invention.

Next, operations of the femto GW 30 in this exemplary embodiment will be described. FIG. 6 is a sequence diagram showing operations when the femto GW 30 has become unable to communicate with the core node 40.

First, a communication failure occurs, and the femto GW 30 becomes unable to communicate with all pieces of core node 40 (S1). The femto GW 30 transmits a service suspension notification to the femto cell base station 20 (S2). Next, adjacent-base-station information is transmitted (S3). Then, the femto cell base station 20 cuts communication with the femto GW 30 (S4). Next, the femto cell base station 20 transmits adjacent-base-station information to the terminal 50 (S5). Following this, a connection release request is transmitted (S6). Next, the femto cell base station 20 suspends wireless transmission (S7). The terminal 50 searches for the next connection destination based on adjacent-base-station information 60 (S8).

In this way, the terminal 50 can look for a next connection destination. Meanwhile, when a service suspension notification has been transmitted from the femto GW 30, a situation that the pieces of terminal 50 to which accommodation is given by the femto GW 30 try to connect to the closest macro base station 10 all together can happen. For this reason, occurrence of congestion is conceivable. However, even in such a case, a connection destination having the next high possibility that it can be connected to can also be searched for promptly according to this exemplary embodiment. Furthermore, because an order of priority is put on a connection destination candidate, even when congestion occurs in an overlapped manner, a connection destination can be searched for successively. In this way, communication can be recovered quickly.

Figure 7:
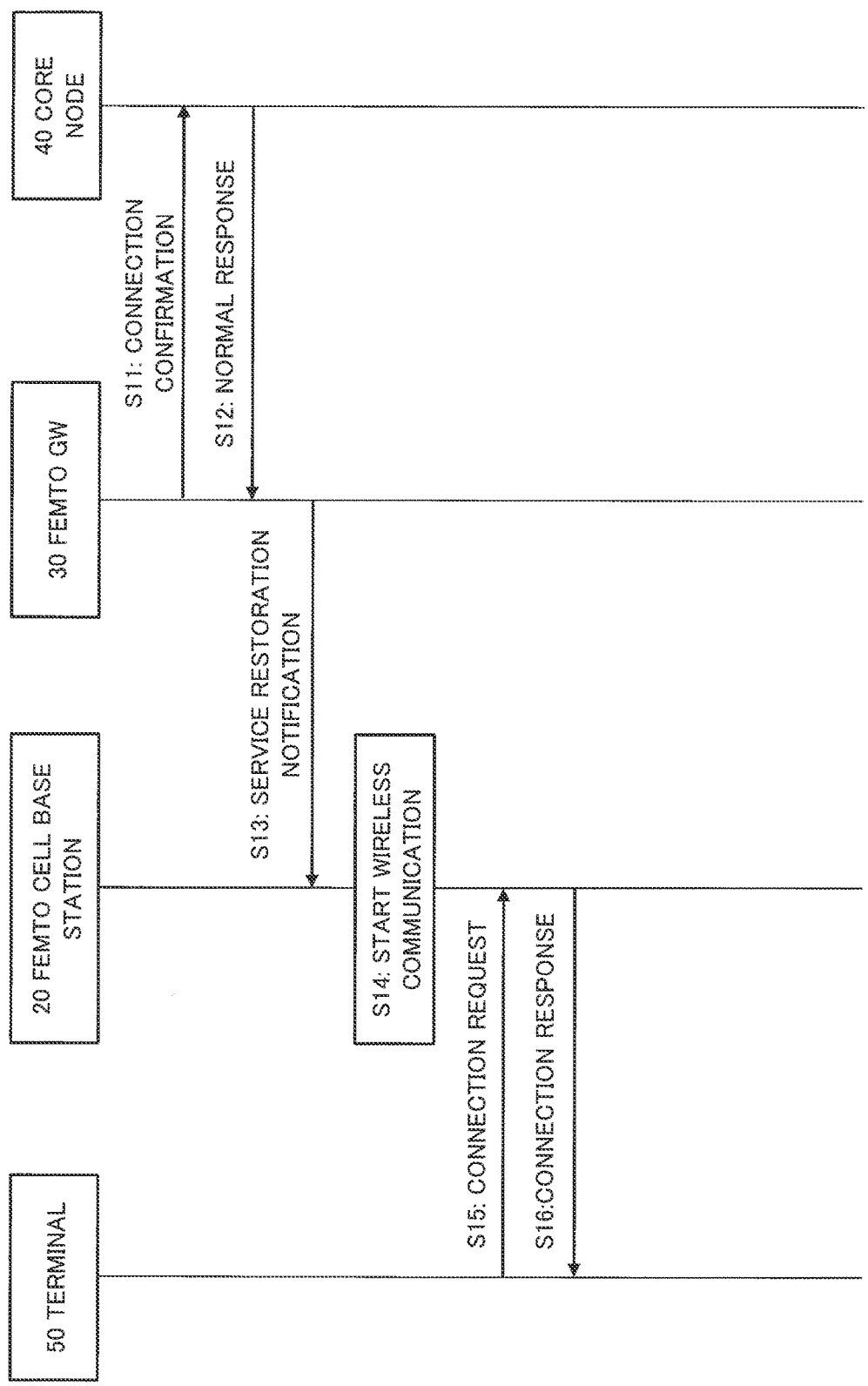
FIG. 7 is a sequence diagram showing operations at the time of communication recovery of the second exemplary embodiment of the present invention.

FIG. 7 is a sequence diagram showing operations when communication between the femto GW 30 and the core node 40 has been restored.

First, the femto GW 30 transmits to the core node 40 a connection confirmation to inquire whether it is connectable (S11). In response to this, the core node 40 transmits a normal response (S12). In response, the femto GW 30 transmits a service restoration notification from the service state informing unit 33 (S13). Next, the femto cell base station 20 begins to perform wireless communication (S14). Next, a connection request is issued to the femto cell base station 20 from the terminal 50 (S15), and a reply is answered from the femto cell base station 20 to establish a connection (S16).

As it has been described above, even when a femto GW becomes unable to communicate with a network of a higher rank, a femto cell base station to which accommodation is given by the femto GW can provide adjacent-base-station information to a terminal. By this, the terminal can search for a different base station and recover communication quickly.

Third Exemplary Embodiment

Figure 8:
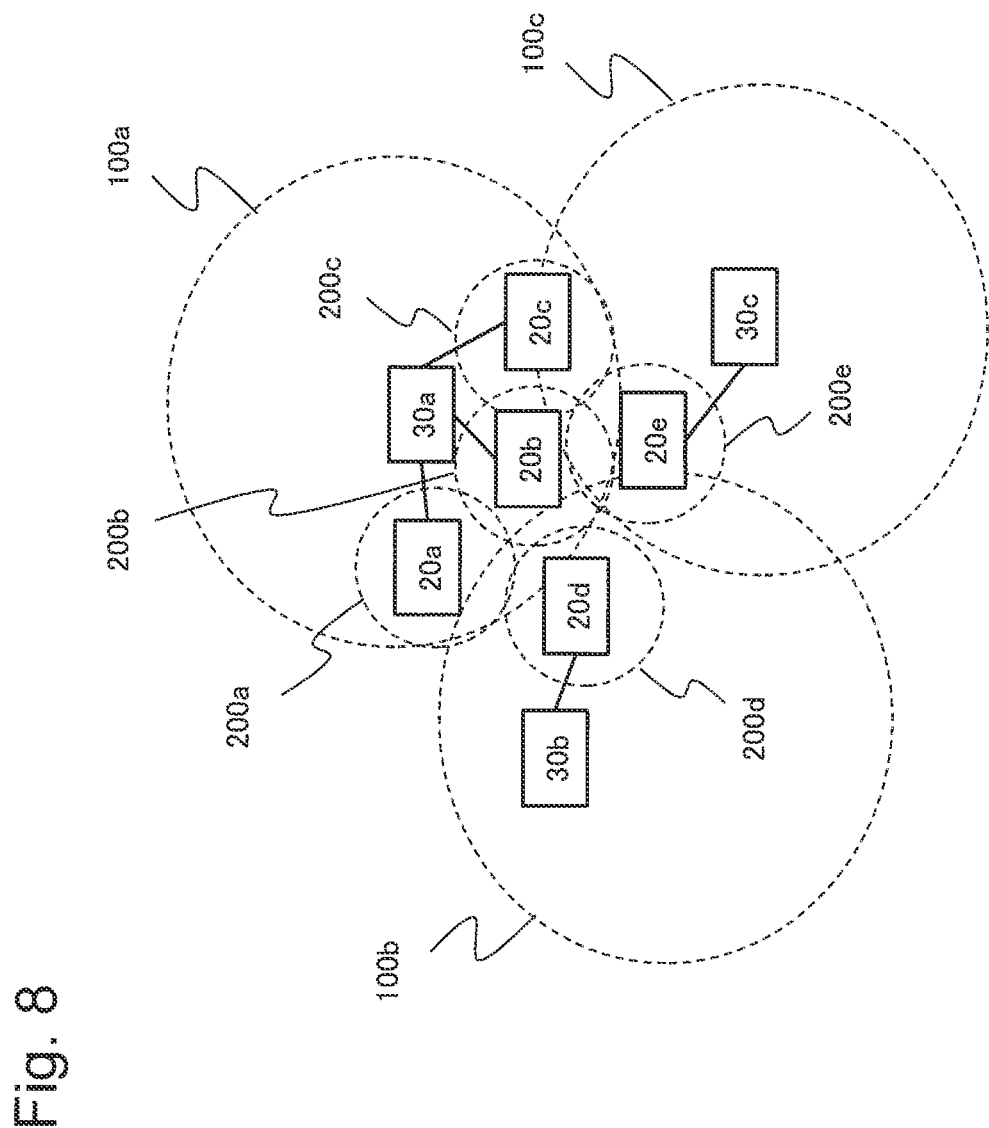
FIG. 8 is a block diagram showing the third exemplary embodiment.

FIG. 8 is a schematic diagram exemplifying the concept of the third exemplary embodiment using specific components. Three femto cell base stations 20a, 20b and 20c are connected to a femto GW 30a existing in the macrocell 100a. Two macrocells 100b and 100c exist adjacent to the macrocell 100a. When the femto GW 30a has become unable to communicate with the core node 40, the adjacent-base-station information 60 is transmitted to each of the connected femto cell base stations 20a and 20b, and 20c from the femto GW 30a in this exemplary embodiment. However, when the macrocell 100a is removed, a base station closest to the base station 20a and a base station closest to the base stations 20b and 20c are different from each other. In such case, it is reasonable that the order of priority of a connection destination candidate list described in the adjacent-base-station information 60 be optimized for each piece of femto cell base station 20. For example, the order of priority of a list to be transmitted to the base station 20a is made to be 1) the macro base station 10b, 2) a femto cell base station 20d . . . , and the order of priority of a list to be transmitted to the base station 20c is made to be 1) a femto cell base station 20e, 2) the macro base stations 10c and the like. That is, the most suitable adjacent-base-station information 60 is transmitted for each area where the femto cell base station 20 is located. The order of priority on a list should just be decided based on location information on the femto cell base station 20.

As it has been described above, according to this exemplary embodiment, search of a base station which can communicate can be sped up.

In the above, the present invention has been described taking the exemplary embodiments mentioned above as exemplary examples. However, the present invention is not limited to the above-mentioned exemplary embodiments. That is, various aspects which a person skilled in the art can understand can be applied to the present invention within the scope of the present invention.

This application claims priority based on Japanese application Japanese Patent Application No. 2013-201990 filed on Sep. 27, 2013, the disclosure of which is incorporated herein in its entirety.

REFERENCE SIGNS LIST

10 Macro base station
20 Femto cell base station
21 Terminal communication unit
22 Network communication unit
23 Control unit
30 Femto GW
31 Femto cell base station management unit
32 Network management unit
33 Service state informing unit
34 adjacent-base-station information storage unit
35 Terminal management unit
36 Control unit
40 Core node
50 Terminal
51 Communication unit
52 Connection destination selection unit
53 Control unit
60 Adjacent-base-station information
100 Macrocell
200 Femto cell
300 Femto gateway
301 First communication means
302 Second communication means
303 Adjacent-base-station information storage means
304 Adjacent-base-station information transmission means

The invention claimed is:

1. A femto gateway, comprising:
an adjacent-base-station information storage configured to hold adjacent-base-station information, the adjacent-base-station information being information on a base station adjacent to a femto cell base station; and
at least one controller configured to
communicate with a core node,
communicate with a femto cell base station,
transmit the adjacent-base-station information to the femto cell base station,
detect a failure of communication with the core node, and
transmit a release request of a connection with a terminal connecting with the femto cell base station to the femto cell base station when the communication failure has been detected,
wherein the at least one controller transmits the adjacent-base-station information when the failure of communication with the core node is detected.

2. The femto gateway according to claim 1,
wherein the adjacent-base-station information comprises a plurality of pieces of adjacent-base-station information, and
wherein, to the plurality of adjacent-base-station information, an order of priority based on easiness of connection from a terminal located within a communication range of the femto cell base station is set.

3. The femto gateway according to claim 2, wherein the setting of an order of priority is performed based on location information on the femto cell base station.

4. A control method of a femto gateway, the femto gateway including an adjacent-base-station information storage and at least one controller, the method comprising:
holding, by the adjacent-base-station information storage, adjacent-base-station information that is information on a base station adjacent to a femto cell base station;
detecting, by the at least one controller, a failure of communication with the core node;
transmitting, by the at least one controller, the adjacent-base-station information to the femto cell base station when the failure of communication with the core node is detected; and
transmitting, by the at least one controller, a release request of a connection with a terminal connecting with the femto cell base station to the femto cell base station when the failure of communication with the core node has been detected.

* * * * *